United States Patent
Gensho

(10) Patent No.: US 11,070,679 B2
(45) Date of Patent: Jul. 20, 2021

(54) CALL SYSTEM FOR SIMULTANEOUS CALLS TO TELEPHONES IN AREA FOR DISASTER AND EMERGENCY

(71) Applicant: Coaido Inc., Tokyo (JP)

(72) Inventor: Makoto Gensho, Tokyo (JP)

(73) Assignee: COAIDO INC., Tokyo (JP)

( * ) Notice: Subject to any disclaimer, the term of this patent is extended or adjusted under 35 U.S.C. 154(b) by 0 days.

(21) Appl. No.: 16/370,485

(22) Filed: Mar. 29, 2019

(65) Prior Publication Data

US 2019/0230227 A1 Jul. 25, 2019

Related U.S. Application Data

(63) Continuation of application No. PCT/JP2017/035132, filed on Sep. 28, 2017.

(30) Foreign Application Priority Data

Sep. 29, 2016 (JP) .............................. JP2016-192360

(51) Int. Cl.
| | |
|---|---|
| H04M 11/04 | (2006.01) |
| H04W 4/90 | (2018.01) |
| H04L 12/18 | (2006.01) |
| H04M 7/00 | (2006.01) |
| G08B 25/08 | (2006.01) |

(Continued)

(52) U.S. Cl.
CPC ............ *H04M 11/04* (2013.01); *G08B 25/002* (2013.01); *G08B 25/08* (2013.01); *G08B 27/006* (2013.01); *H04L 12/18* (2013.01); *H04M 7/006* (2013.01); *H04W 4/90* (2018.02)

(58) Field of Classification Search
CPC ......... H04M 2242/04; H04M 2242/14; H04M 3/4228; H04W 4/22; H04W 4/90; H04W 76/007; H04W 76/50
See application file for complete search history.

(56) References Cited

U.S. PATENT DOCUMENTS

| | | | | |
|---|---|---|---|---|
| 7,515,041 B2 * | 4/2009 | Eisold | .................. | G08B 27/008 340/286.02 |
| 2005/0233727 A1 * | 10/2005 | Poikselka | ............... | H04L 67/18 455/404.2 |

(Continued)

FOREIGN PATENT DOCUMENTS

| | | |
|---|---|---|
| JP | 2002-092265 | 3/2002 |
| JP | 2004-240624 | 8/2004 |

(Continued)

OTHER PUBLICATIONS

WIPO, International Search Report in corresponding PCT application PCT/JP2017/035132, dated Dec. 26, 2017.

(Continued)

*Primary Examiner* — Liton Miah
(74) *Attorney, Agent, or Firm* — Ryan Alley IP

(57) ABSTRACT

A call apparatus includes a storage unit that stores therein location information of call target telephones including a landline telephone, a receiving unit that receives an SOS, and a control unit that accesses the storage unit to specify telephones located within a prescribed range from the source point of the SOS received by the receiving unit, and simultaneously calls the specified telephones.

5 Claims, 18 Drawing Sheets

(51) Int. Cl.
    *G08B 27/00*     (2006.01)
    *G08B 25/00*     (2006.01)

(56)     References Cited

U.S. PATENT DOCUMENTS

| | | | | |
|---|---|---|---|---|
| 2006/0273884 | A1* | 12/2006 | Watkins | G08B 25/007 |
| | | | | 340/425.5 |
| 2014/0227991 | A1* | 8/2014 | Breton | G08B 25/006 |
| | | | | 455/404.2 |
| 2014/0253321 | A1* | 9/2014 | Srinivasan | G08B 13/00 |
| | | | | 340/539.11 |
| 2017/0358196 | A1* | 12/2017 | Jang | G08B 27/006 |

FOREIGN PATENT DOCUMENTS

| | | |
|---|---|---|
| JP | 2006-191281 | 7/2006 |
| JP | 2006-235663 | 9/2006 |

OTHER PUBLICATIONS

WIPO, Written Opinion of the ISA in corresponding PCT application PCT/JP2017/035132, dated Dec. 26, 2017.

\* cited by examiner

SOURCE INFORMATION TABLE T1

| SOS TYPE | COORDINATE INFORMATION | ADDRESS | FACILITY NAME |
|---|---|---|---|
| PERSON IN CARDIAC ARREST | 35.633823,139.7370466 | ... Minato ku, Tokyo | - |
| FIRE | - | - | ○○ Building |
| GAS LEAKAGE | 35.7781432,139.7924953 | ... Adachi-ku, Tokyo | Suzuki Shop |
| LOCAL DISASTER | - | ... Edogawa-ku, Tokyo | - |
| TSUNAMI | - | ... Ota-ku, Tokyo | - |
| ALARM | 35.4456082,139.6374428 | - | - |
| DANGEROUS OBJECT | - | ... Yokohama-shi, Kanagawa | - |
| TERRORISM | - | ... △△-shi, Kanagawa | △△ City Hall |

T2 REGISTRATION INFORMATION TABLE

| NAME | FACILITY NAME | ORGANI-ZATION NAME | DEPART-MENT NAME | POSTAL CODE | ADDRESS | ADDRESS CODE | COORDINATE INFORMATION | TELE-PHONE TYPE | TELE-PHONE NUMBER | MAIL ADDRESS |
|---|---|---|---|---|---|---|---|---|---|---|
| Tado Yamada | Sato Building | Yamada | General Affairs Division | 108-·· | ·· Minato-ku, Tokyo | 1300·· | 35.3659724··· | Landline telephone | 03-···· | yamada@·· |
| Ichiro Suzuki | Suzuki Shop | Suzuki Shop | — | 120-·· | ·· Adachi-ku, Tokyo | 1302·· | 35.5362548··· | Smartphone | 090-···· | — |
| Hanako Tanaka | Kimura Apartment | Private | — | 220-·· | ·· Yokohama-shi, Kanagawa | 1400·· | 35.8576282··· | Mobile telephone | 080-···· | — |

T2a REGISTRATION INFORMATION TABLE

| NAME | FACILITY NAME | ... | MAIL ADDRESS | REGISTRATION TYPE ||||||
|---|---|---|---|---|---|---|---|---|---|
| | | | | AED | CPR | FIRE | LOCAL DISASTER | GAS LEAKAGE | DANGEROUS OBJECT |
| Taro Yamada | Sato Building | ... | yamada@* | 1 | 1 | 1 | 1 | 1 | 1 |
| Ichiro Suzuki | Suzuki Shop | ... | : | 0 | 1 | 1 | 1 | 1 | 1 |
| Hanako Tanaka | Kimura Apartment | ... | : | 0 | 0 | 1 | 1 | 1 | 1 |

FIG. 11

T3 EXTRACTION RANGE TABLE

| REGISTRATION TYPE | PREFECTURE | CITY | WARD | TOWN | LARGE VILLAGE SECTION | SMALL VILLAGE SECTION | BLOCK NUMBER | HOUSE NUMBER |
|---|---|---|---|---|---|---|---|---|
| FIRE | 0 | 0 | 0 | 0 | 0 | 0 | 1 | 1 |
| GAS LEAKAGE | 0 | 0 | 0 | 0 | 1 | 1 | 1 | 0 |
| DANGEROUS OBJECT | 0 | 0 | 0 | 0 | 1 | 1 | 1 | 0 |
| AED | 0 | 0 | 0 | 1 | 0 | 0 | 0 | 0 |
| CPR | 0 | 1 | 1 | 1 | 0 | 0 | 0 | 0 |
| LOCAL DISASTER | 0 | 0 | 0 | 0 | 0 | 0 | 0 | 0 |

FIG. 13

CALL SYSTEM FOR SIMULTANEOUS CALLS TO TELEPHONES IN AREA FOR DISASTER AND EMERGENCY

CROSS-REFERENCE TO RELATED APPLICATION

This application is a continuation application of International Application PCT/JP2017/035132 filed on Sep. 28, 2017, designating the U.S. and claiming priority from Japanese Patent Application No. 2016-192360 filed on Sep. 29, 2016. The entire contents of both foregoing applications are incorporated herein by reference.

FIELD

The embodiments discussed herein relates to a call system for simultaneous calls to telephones in an area for disaster and emergency.

BACKGROUND

There has been known an alert system for occurrence of an emergency, such as a disaster. For example, the following method has been known: A contact telephone number, such as a mobile telephone number, of a field manager is registered in an alert device in advance. Then, when a disaster occurs, a field worker performs prescribed operations, so that the alert device immediately and automatically calls the contact telephone number to report the disaster information. Please see, for example, Japanese Laid-open Patent Publication No. 2007-122107.

In the case of simultaneous emergency calls, it is possible to automatically call a plurality of previously-registered telephone numbers simultaneously. However, in the case of an emergency patient, disaster, an incident, or the like we never know when, it is difficult to narrow down call targets to only telephone numbers in the area around the scene.

For example, consider the case where a person suffers from sudden cardiac arrest and another person who happens to be there goes to borrow an AED (automated external defibrillator) at an office, an apartment, or the like nearby. If he/she suddenly visits the office, apartment, or the like to ask for an AED, a manager who manages the AED there would not understand the situation immediately, and so it is difficult for the manager to confirm whether there is a person who really needs the AED nearby, and if the manager is not present, another person is not able to decide whether to lend the AED to the third party. That is, there is a problem that it is not possible to lend the AED immediately although an immediate treatment is needed.

SUMMARY

To achieve the above object, there is provided a call apparatus including: a first memory configured to store therein location information of telephones including a landline telephone, the telephones being call targets; a second memory configured to store therein information indicating, for each type of SOS, a range of an area to be used for extraction; a receiving unit configured to receive an SOS; and a processor configured to perform a process including accessing the second memory to determine an area to be used for extraction, according to a type of the SOS received by the receiving unit, accessing the first memory to specify telephones located within the determined area, and simultaneously calling the specified telephones.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is an example of data stored in a source information storage unit.

FIG. 5 is an example of data stored in a registration information storage unit.

FIG. 11 illustrates a registration information table according to a second embodiment.

FIG. 13 illustrates an example of data stored in the registration information storage unit according to the second embodiment.

DESCRIPTION OF EMBODIMENTS

Hereinafter, a call system according to embodiments will be described in detail with reference to the accompanying drawings.

Embodiment

Figure 1:
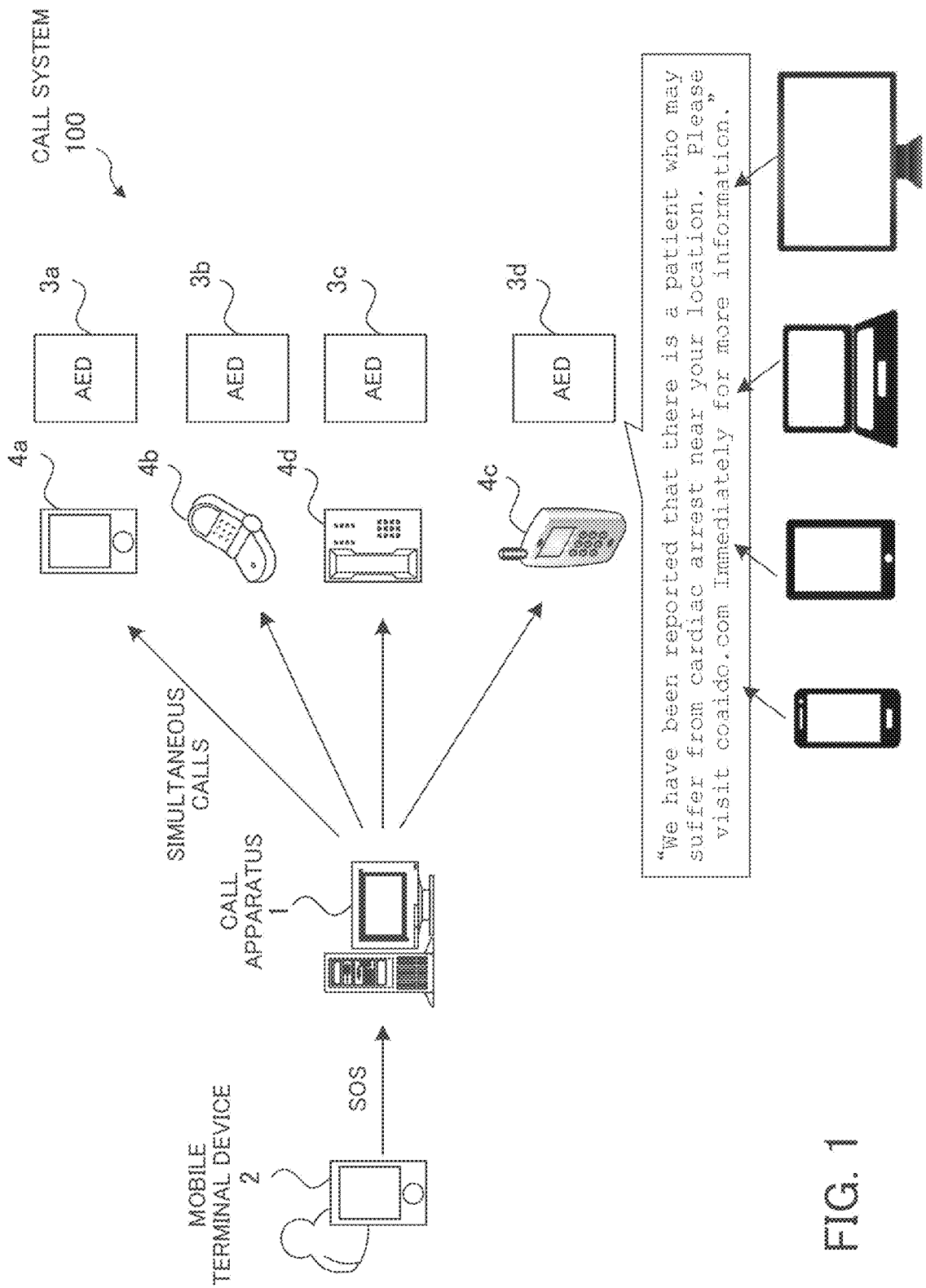
FIG. 1 illustrates an outline of a call system according to one embodiment.

FIG. 1 illustrates an outline of a call system according to one embodiment.

The call system 100 includes a call apparatus (computer) 1.

The call apparatus 1 receives an SOS, meaning an emergency, from a user's terminal (mobile terminal device 2 in FIG. 1). The installation location of the call apparatus 1 is not particularly limited, and for example, the call apparatus 1 may be installed at a fire department or the like.

SOS types include, but are not limited to, the following: a person in cardiac arrest, a fire, a gas leakage, a local disaster, a Tsunami, a flood, a landslide disaster, an eruption, a variety of warnings, a finding of a dangerous object, a terrorism, and others, for example.

As an example of SOS, the following describes the case where a pedestrian who has found a person in cardiac arrest wants someone to bring an AED to the scene.

The call apparatus 1 has registered therein a variety of telephones 4a to 4d of users who manage AEDs 3a to 3d. The variety of telephones include mobile terminal devices (a variety of telephones 4a to 4c in FIG. 1) and landline telephones (a telephone 4d in FIG. 1).

The call apparatus 1 which has received an SOS from a notifier searches a previously stored database on the basis of the location information of his/her mobile terminal device 2 to specify a variety of telephones that are located near the scene.

The call apparatus 1 then simultaneously makes a call (telephone call) to the specified telephones 4a to 4d. The call apparatus 1 then plays an automatic voice message for the users answering the call. An example of such automatic voice messages may be "We have been reported that there is a patient who may suffer from cardiac arrest near your location. Please visit coaido.com immediately for more information." Note that the above access destination URL is just an example. In addition, different automatic voice messages may be used for different disaster types. In addition, part of the reported information, such as a facility name and address of the scene, or an action to take may be delivered via an automatic voice message or may be announced by a person.

The above call system 100 makes it possible to send an SOS message (advance notice) to telephones including landline telephones, irrespective of the device types of the telephones. Thereby, when someone goes to a receiver of a simultaneous call to ask for an AED, the receiver is able to lend the AED right away since the receiver already knows the content of the SOS.

Note that information in URLs included in automatic voice messages is accessible to a variety of electronic devices having a browser function.

Hereinafter, the disclosed call system 100 will be described in more detail.

Figure 2:
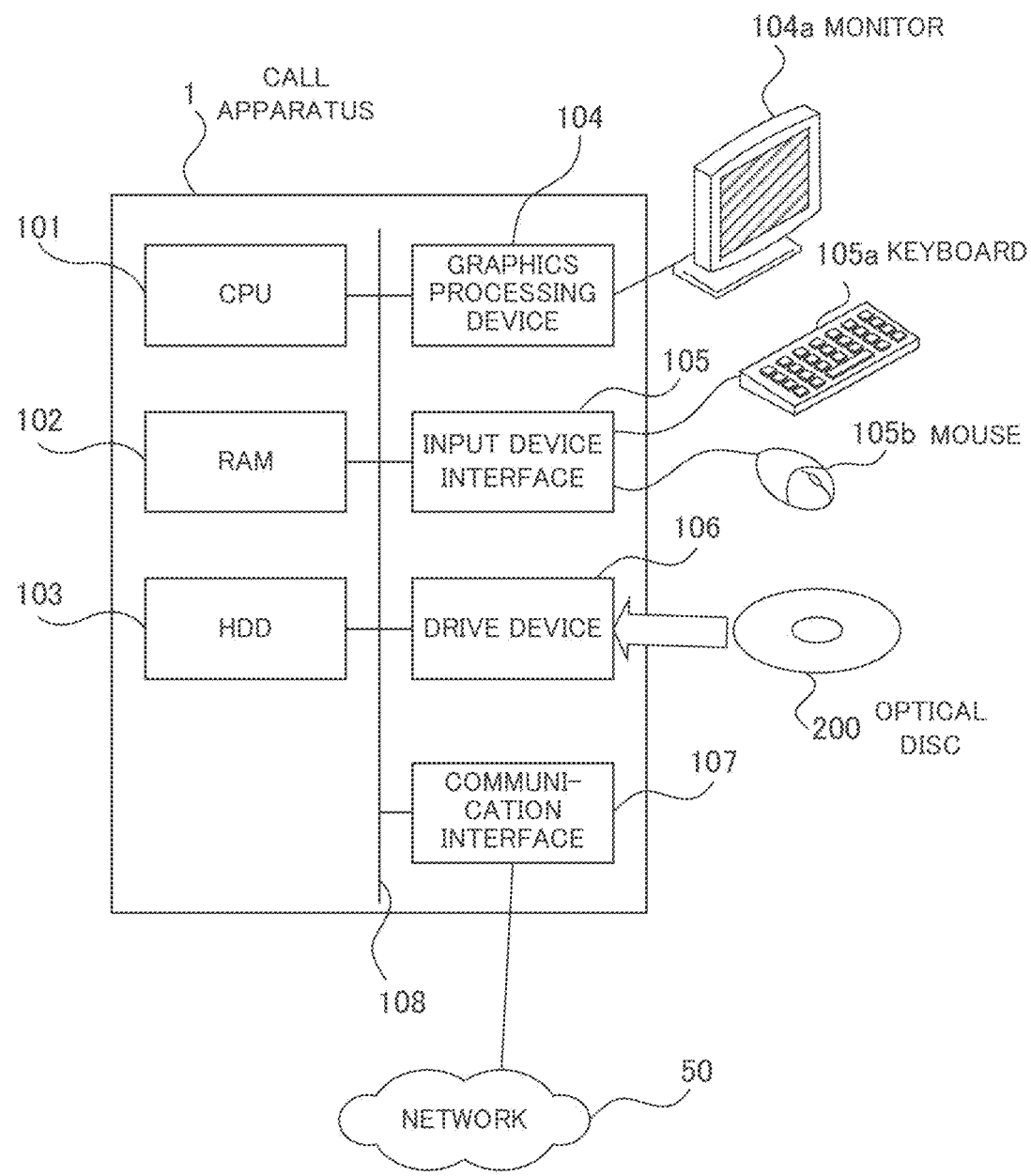
FIG. 2 illustrates a hardware configuration of a call apparatus according to the embodiment.

FIG. 2 illustrates a hardware configuration of the call apparatus according to the embodiment.

The call apparatus 1 is entirely controlled by a CPU (central processing unit) 101. A RAM (random access memory) 102 and a plurality of peripheral devices are connected to the CPU 101 via a bus 108.

The RAM 102 is used as a main storage device of the call apparatus 1. The RAM 102 temporarily stores therein at least part of OS (operating system) programs and application programs that are executed by the CPU 101. In addition, the RAM 102 stores therein various kinds of data to be used by the CPU 101 in processing.

Connected to the bus 108 are a HDD (hard disk drive) 103, a graphics processing device 104, an input device interface 105, a drive device 106, and a communication interface 107.

The HDD 103 magnetically writes and reads data on a built-in disk. The HDD 103 is used as an auxiliary storage device of the call apparatus 1. The OS programs, application programs, and various kinds of data are stored in the HDD 103. A semiconductor storage device, such as a flash memory, may be used as an auxiliary storage device.

The graphics processing device 104 is connected to a monitor 104a. The graphics processing device 104 displays images on a screen of the monitor 104a in accordance with instructions from the CPU 101. Examples of the monitor 104a include a display device using CRT (cathode ray tube) and a liquid crystal display.

The input device interface 105 is connected to a keyboard 105a and a mouse 105b. The input device interface 105 gives signals received from the keyboard 105a and mouse 105b to the CPU 101. The mouse 105b is an example of a pointing device, and another kind of pointing device may be used. Other examples of the pointing device include a touch panel, a tablet, a touchpad, a trackball, and others.

The drive device 106 reads data from, for example, a portable recording medium such as an optical disc, on which data is recorded so as to be readable with reflection of light, or a USB (universal serial bus) memory. For example, in the case where the drive device 106 is an optical drive device, data recorded on an optical disc 200 may be read with laser light or the like. Examples of the optical disc 200 include a Blu-ray (registered trademark), a DVD (digital versatile disc), a DVD-RAM, a CD-ROM (compact disc read only memory), a CD-R (recordable), and a CD-RW (rewritable).

The communication interface 107 is connected to a network 50. The communication interface 107 communicates data with another computer or communication device over the network 50.

With the above hardware configuration, the processing functions of the present embodiment may be implemented.

Figure 3:
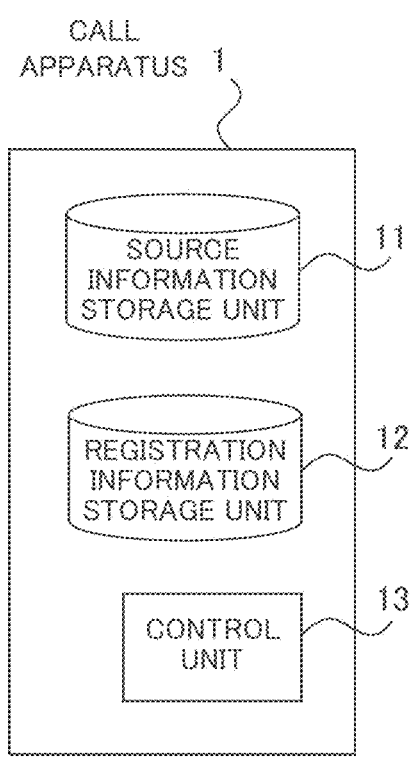
FIG. 3 is a block diagram illustrating functions of the call apparatus according to the embodiment.

FIG. 3 is a block diagram illustrating functions of the call apparatus according to the embodiment.

The call apparatus 1 includes a source information storage unit 11, a registration information storage unit 12, and a control unit 13.

The source information storage unit 11 stores therein a history of information (source information) about source points where SOSs were sent.

The registration information storage unit 12 stores therein information on the managers of AEDs and information on telephones at which the managers are reachable.

FIG. 4 illustrates an example of data stored in the source information storage unit.

Referring to FIG. 4, data is stored in tabular form.

The source information table T1 has the following columns: SOS Type, Coordinate Information, Address, and Facility Name. Information items arranged in a horizontal direction are associated with each other.

The SOS Type column indicates the type of an emergency at a source point where an SOS was sent. In the case where any SOS type is not registered at the time of the SOS being sent or in the case where the SOS is reported using a landline telephone or the like, the operator of the call apparatus 1 who receives the SOS may manually enter the SOS type.

The Coordinate Information column contains the coordinate information of the source point where the SOS was sent.

The Address column contains the address of the source point where the SOS was sent.

The Facility Name column contains the facility name of the source point where the SOS was sent. If the incident does not occur at any facility, this column is null.

FIG. 5 illustrates an example of data stored in the registration information storage unit.

Referring to FIG. 5, data is stored in tabular form.

The registration information table T2 has the following columns: Name, Facility Name, Organization Name, Department Name, Postal Code, Address, Address Code, Coordinate Information, Telephone Type, Telephone Number, and Mail Address. Information items arranged in a horizontal line are associated with each other. These information items are registered in advance.

The Name column contains the name of a person (receiver) who receives calls.

The Facility Name column contains the name of a facility where the receiver works or lives.

The Organization Name column indicates the organization (office name or the like) to which the receiver belongs. "Private" in this column indicates that the receiver is under private management.

The Department Name column contains the name of a department to which the receiver belongs, if the organization is an office or the like.

The Postal Code column contains the postal code of the address registered in the Address column.

The Address column contains the address of a receiver's workplace if the organization is an office or the like. If the receiver's workplace is his house, the address of the personal house is registered.

The Address Code column contains the address code of the address registered in the Address column.

The Coordinate Information column contains the coordinate information of an AED installation location.

The Telephone Type column contains the type of a telephone that the receiver uses to receive calls.

The Telephone Number column contains the telephone number of the receiver's telephone.

The Mail Address column contains the address of an email address that the receiver uses.

The following describes how the control unit 13 operates.

Figure 6:
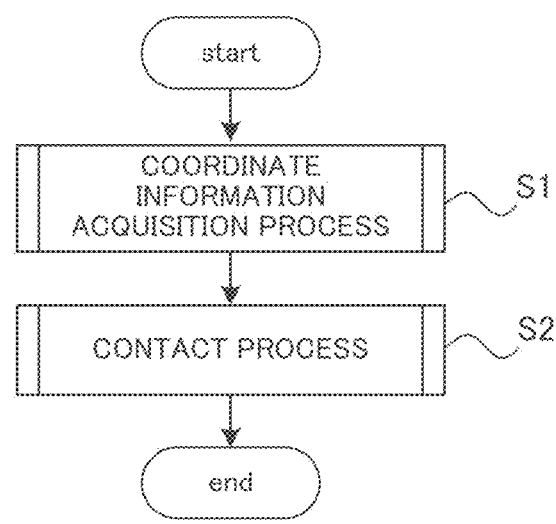
FIG. 6 is flowchart for explaining processing a control unit performs.

FIG. 6 is a flowchart for explaining processing the control unit performs.

(Step S1) The control unit 13 performs a process (coordinate information acquisition process) of obtaining the coordinate information of a source point where an SOS has been sent and registering it in the source information table T1. Then, the process proceeds to step S2. The coordinate information acquisition process will be described in detail later.

(Step S2) After obtaining the coordinate information of the source point where the SOS has been sent, the control unit 13 performs a process (contact process) of narrowing down contact target telephones and contacting their telephone numbers. This contact process will be described in detail later.

The following describes the coordinate information acquisition process of step S1 of FIG. 6 with reference to a flowchart.

Figure 7:
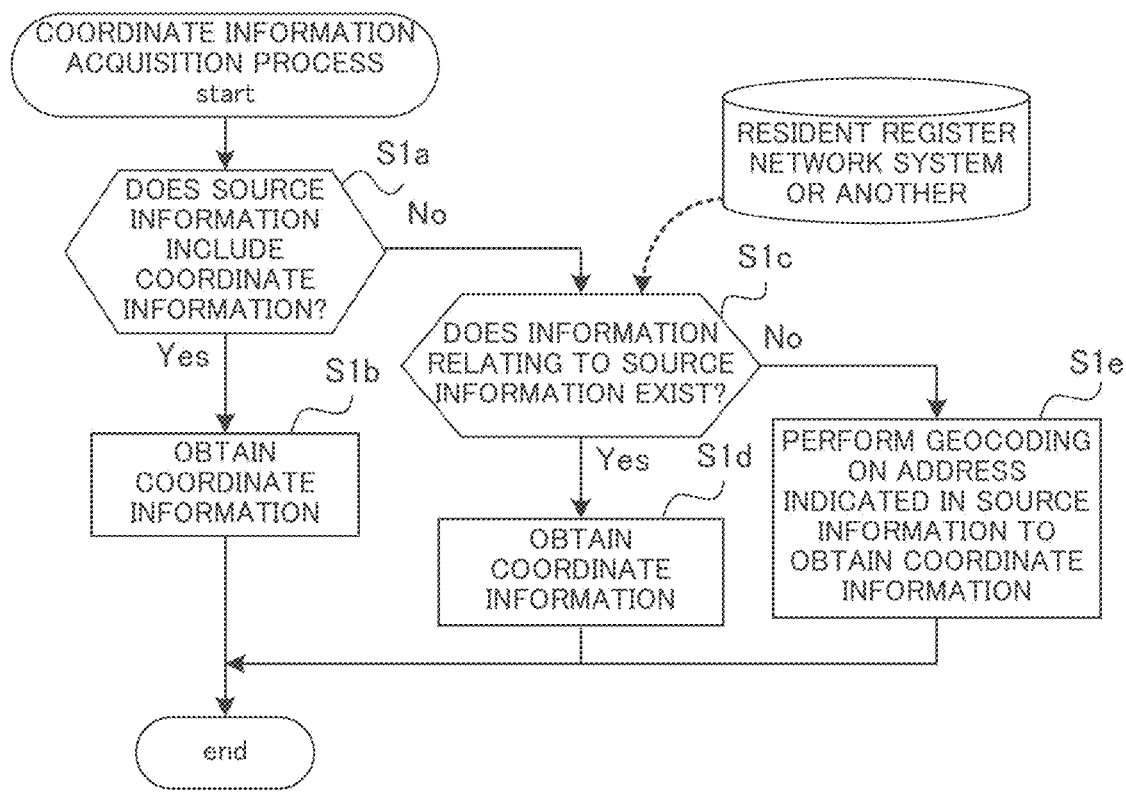
FIG. 7 is a flowchart for explaining a coordinate information acquisition process.

FIG. 7 is a flowchart for explaining the coordinate information acquisition process.

(Step S1a) The control unit 13 determines whether the source information includes coordinate information. For example, in the case where source information is sent from a mobile terminal device, it is possible to generate the source information including coordinate information using the GPS function of the mobile terminal device. If the source information includes coordinate information (yes at step S1a), the process proceeds to step S1b. If the source information does not include coordinate information (no at step S1a), the process proceeds to step S1c.

(Step S1b) The control unit 13 obtains the coordinate information from the source information. Then, the control unit 13 completes the process of FIG. 7.

(Step S1c) The control unit 13 determines whether information relating to the source information exists. For example, in the case where source information is sent from a landline telephone, it is possible to find an address associated with the landline telephone, using a resident register network system or a database that contains telephone directory information. Therefore, in the case where source information is sent from a landline telephone, the control unit 13 determines that information relating to the source information exists. If information relating to the source information exists (yes in step S1c), the process proceeds to step S1d. If information relating to the source information does not exist (no in step S1c), the process proceeds to step S1e.

(Step S1d) The control unit 13 obtains coordinate information from the information relating to the source information. Then, the control unit 13 completes the process of FIG. 7.

(Step S1e) The control unit 13 performs geocoding on the address indicted in the source information to obtain coordinate information. Then, the control unit 13 completes the process of FIG. 7.

The following describes the contact process of step S2 of FIG. 6 with reference to a flowchart.

Figure 8:
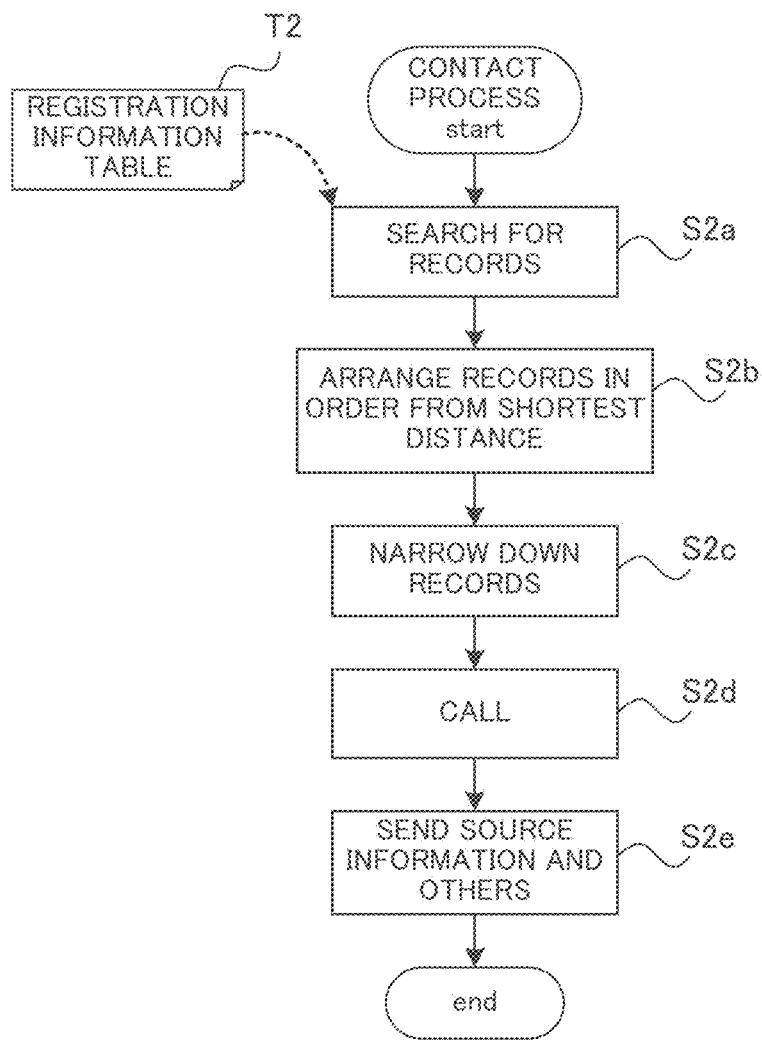
FIG. 8 is a flowchart for explaining a contact process.

FIG. 8 is a flowchart for explaining the contact process.

(Step S2a) The control unit 13 searches the registration information table T2 to find records with coordinate information falling within a prescribed search range from the coordinate information of the source point. Then, the process proceeds to step S2b.

(Step S2b) The control unit 13 arranges the records found through the search of step S2a, in order from the shortest distance to the coordinate information of the source point. Then, the process proceeds to step S2c.

(Step S2c) The control unit 13 extracts a prescribed number of records in order from the shortest distance (narrows down the records). Then, the process proceeds to step S2d.

(Step S2d) The control unit 13 simultaneously calls the contact target telephone numbers indicated in the records extracted in step S2c and plays an automatic voice message to let receivers know the occurrence of the SOS, the source information, and the URL of a map with an AED installation location, an evacuation area, or others marked. In this connection, if a contact target telephone is a smartphone, the audio voice message does not need to include the URL.

(Step S2e) The control unit 13 sends the source information and the URL of the map with the AED installation location, the evacuation area, or others marked, with reference to the Mail Address column of the records extracted in step S2c. In addition, if an extracted record indicates a mobile telephone number, the control unit 13 may send the source information and the URL of the map with the AED installation location, the evacuation area, or others marked, to the mobile telephone number via an SMS (short message service). If an extracted record indicates a smartphone, the control unit 13 may send a link destination URL or the like for starting a reception application installed in the smartphone, text, images or the like for the details of disaster information via an SMS. Then, the control unit 13 completes the process of FIG. 8. In this connection, steps S2b and S2c may be omitted.

Figure 9:
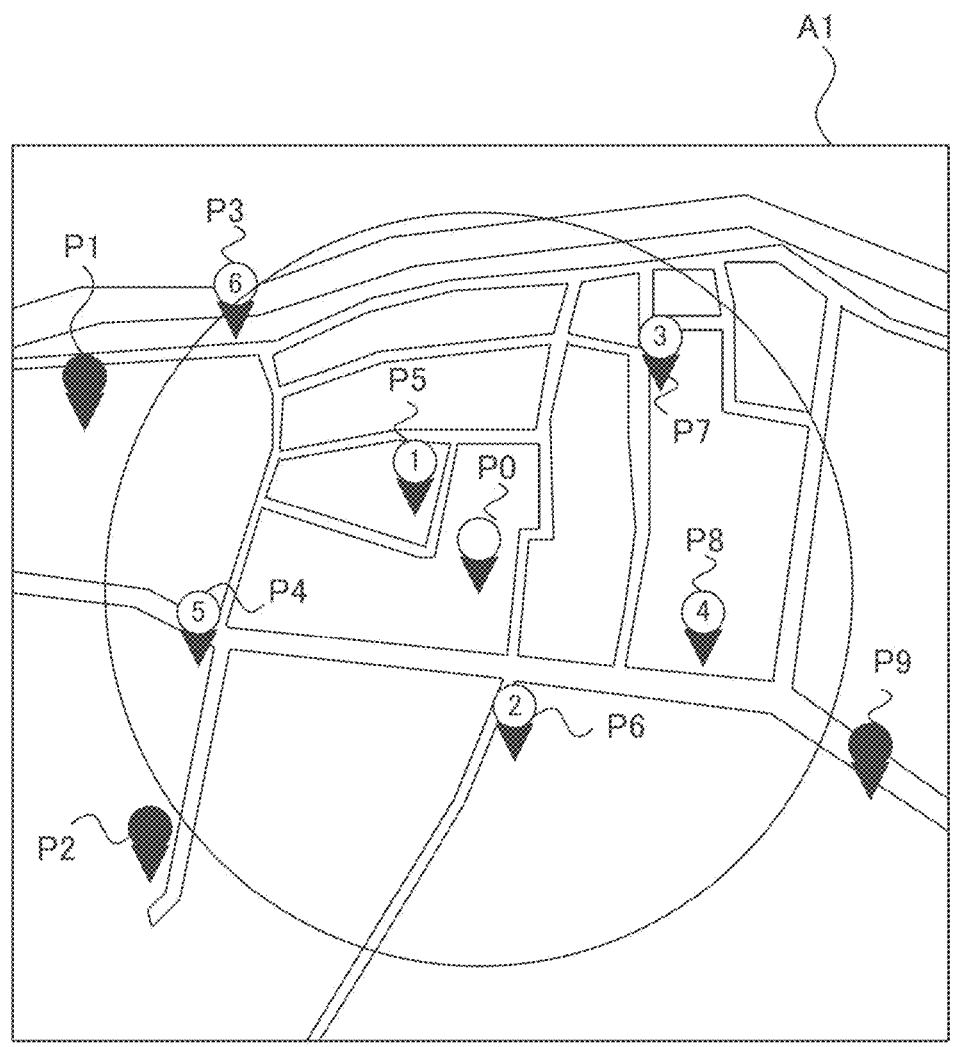
FIG. 9 is a view for explaining an image for a narrowing-down process.

FIG. 9 is a view for explaining an image for the narrowing-down process.

FIG. 9 indicates that, with respect to an area A1, nine pieces of coordinate information P1 to P9 are registered in the registration information table T2.

FIG. 9 depicts the case where a person has suffered from sudden cardiac arrest at a source point P0. The control unit 13 searches the registration information table T2 to find records with coordinate information P3 to P8 falling within a radius of 500 m (prescribed search range) from the source point P0, assigns sequential numbers to these pieces of coordinate information in order from the shortest distance to the source point P0, and extracts records with the top four pieces of coordinate information P5, P6, P7, and P8. Then, the control unit 13 simultaneously calls the telephone numbers indicated in the four extracted records.

If the call is not received, the control unit 13 repeats a call a prescribed number of times.

Figure 10:
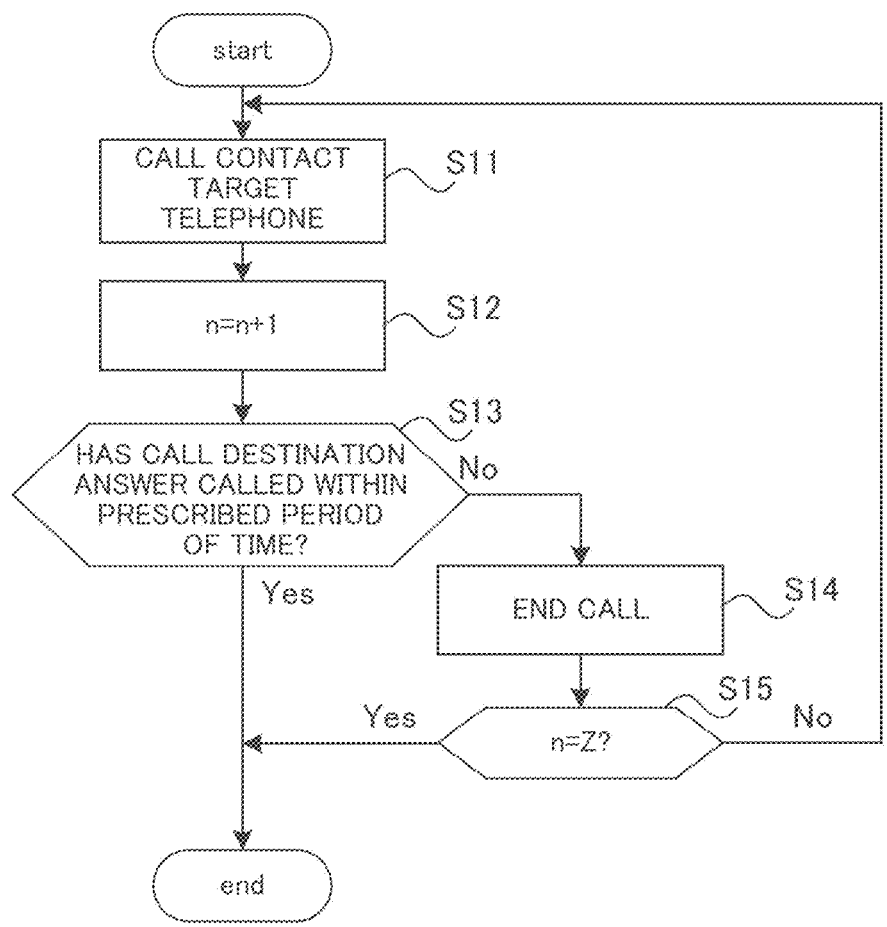
FIG. 10 is a flowchart for explaining a process for a call that is not received.

FIG. 10 is a flowchart for explaining a process for a call that is not received.

(Step S11) The control unit 13 calls a contact target telephone. Then, the process proceeds to step S12.

(Step S12) The control unit 13 increments a parameter n for counting the number of call trials (the initial value of n is zero). Then, the process proceeds to step S13.

(Step S13) The control unit 13 determines whether the call destination has answered the call within a prescribed period of time (for example, within 20 seconds). If the call destination has answered the call within the prescribed period of time (yes in step S13), the control unit 13 completes the process of FIG. 10. If the call destination has not answered the call within the prescribed period of time (no in step S13), the process proceeds to step S14.

(Step S14) The control unit 13 ends the call. Then, the process proceeds to step S15.

(Step S15) The control unit 13 determines whether the value of the parameter n is equal to a call termination parameter Z (for example, Z=5). If the value of the parameter n is equal to the call termination parameter Z (yes in step S15), the control unit 13 completes the process of FIG. 10. If the value of the parameter n is less than the call termination parameter Z (no in step S15), the process proceeds to step S11.

As described above, the call apparatus 1 is able to simultaneously call telephones including landline terminals, irrespective of the device types of the telephones. In addition, the call apparatus 1 is able to make a phone call to people who manage AEDs to promote them to access a designated URL using their browsers. Alternatively, the call apparatus 1 is able to notify such people of the address, detailed location, and conditions of a person in danger, by using audio, text, maps, videos, and others with a combination of mail, SMS, SOS reception application, and other means. This may promote a person who receives the information with a landline telephone to confirm a map or the information and to carry an AED to the scene, rather than waiting for someone who would come and ask for the AED. Even if a person does not have a PC or mobile terminal, he/she is able to receive the information with a landline telephone and to know about someone in cardiac arrest. Therefore, the person is able to know that someone may come to ask for an AED that he/she manages within a few minutes, and to prepare the AED in advance. This promotes smooth communication to lend and borrow the AED. The above has described the case where a pedestrian who finds a person in cardiac arrest uses his/her smartphone terminal or the like to send an SOS, by way of example. Not only smartphones but also PCs, a command communication system, and others may be used for sending SOSs. In addition, senders of SOS messages or users of the call system may be staff members of a public organization (fire department, police station, or the like) or a private organization (private emergency office, security company, or the like) which deals with emergency information.

Second Embodiment

A call system of a second embodiment will now be described.

With respect to the call system of the second embodiment, differences from the first embodiment will mainly be described below and description on the same features will be omitted.

The first embodiment has described the case where an SOS type is existence of a person in cardiac arrest. The SOS type is not limited thereto, and the second embodiment will describe how the call apparatus 1 operates according to other SOS types.

FIG. 11 illustrates a registration information table according to the second embodiment. Some of the same columns as the registration information table T2 are omitted.

The registration information table T2a has a Registration Type column, in addition to the columns included in the registration information table T2.

The Registration Type column indicates emergency types that receivers are able to deal with. Referring to FIG. 11, examples of the emergency types include AED request, CPR (Cardio Pulmonary Resuscitation (CPR) request, fire, local disaster, gas leakage, and warning and alert for dangerous object. A value of "1" is set with respect to a registration type about which a receiver desires to receive information.

Figure 12:
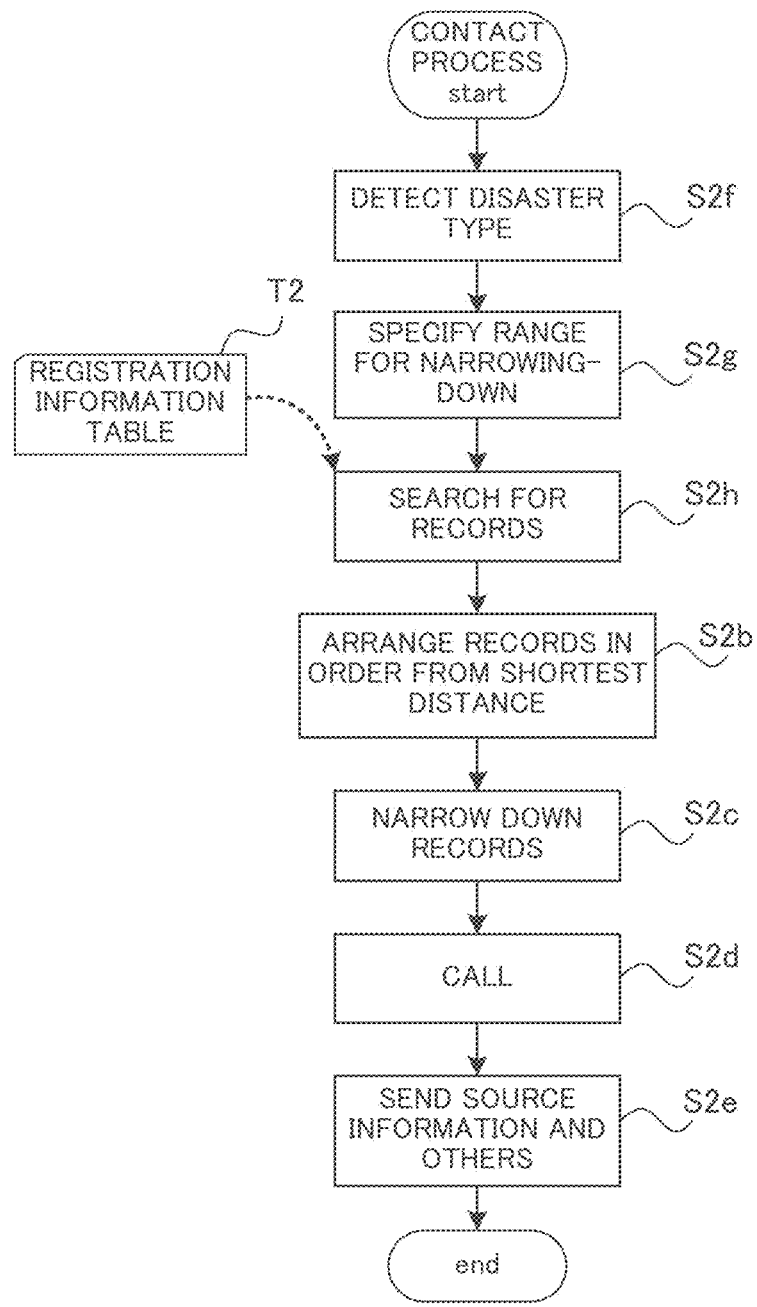
FIG. 12 is a flowchart for explaining a contact process according to the second embodiment.

FIG. 12 is a flowchart for explaining a contact process according to the second embodiment.

[Step S2f] The control unit 13 detects an SOS type with reference to the source information table T1. Then, the process proceeds to step S2g.

[Step S2g] The control unit 13 specifies a search range corresponding to the SOS type detected in step S2f, from search ranges respectively preset for SOS types. Then, the process proceeds to step S2h.

[Step S2h] On the basis of the search range specified in step S2g, the control unit 13 finds records with coordinate information falling within the prescribed search range from the coordinate information of the source point. At this time, the control unit 13 searches records that contains the SOS type detected in step S2f in the Registration Type column of the registration information table T2a.

Note that step S2b and subsequent steps are executed in the same manner as described in the first embodiment, and therefore explanation on these steps is omitted.

The following describes how to specify a search range in step S2g. As an example, the control unit 13 extracts the address of a source point on the basis of the coordinate information of the source point. Then, the control unit 13 searches the registration information table T2 to find records with the same postal code as the extracted address.

FIG. 13 illustrates an example of data stored in a registration information storage unit according to the second embodiment. Referring to FIG. 13, data is stored in tabular form.

An extraction range table T3 has items for registration type and address codes to be used as an extraction range. A value of "1" is set for address codes that are processed (are able to be processed) with respect to an emergency set in the registration type column. Information items arranged in horizontal direction are associated with each other. These information is registered in advance.

Figure 14:
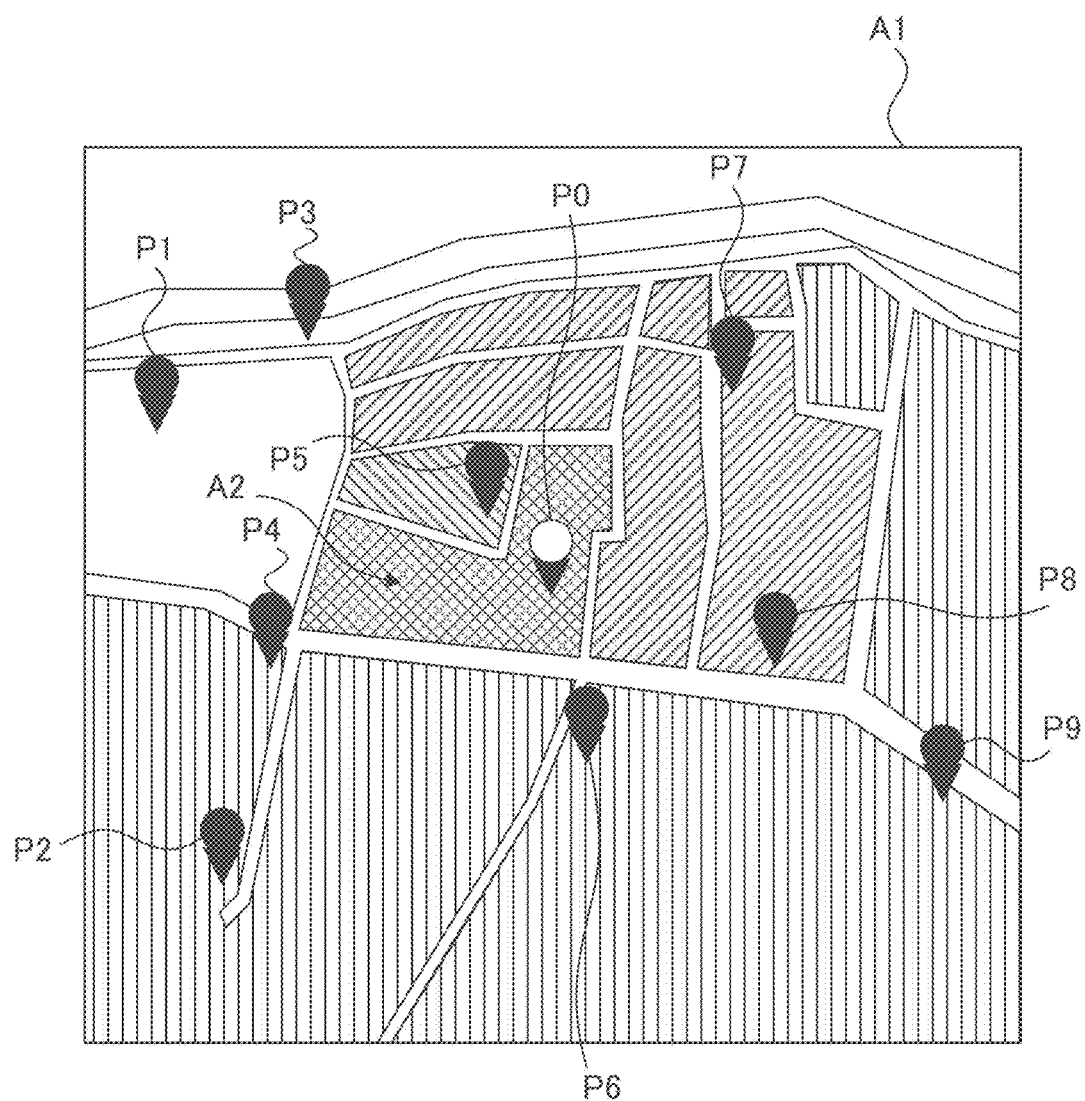
FIG. 14 is an example of specifying a search range.

FIG. 14 illustrates an example of specifying a search range. In FIG. 14, oblique lines of different types indicate an extraction range for block numbers and house numbers, an extraction range for large village section and small village section, an extraction range for town, and an extraction range for city and ward.

For example, when a fire occurs at point P0, the control unit 13 detects an area A2 corresponding to the block numbers and house numbers with reference to the extraction range table T3.

In this way, it is possible to set extraction ranges for the individual registration types in detail, in units of prefecture, city, ward, town, large village section, small village section, block numbers, and house numbers.

The call system of the second embodiment is able to provide the same effects as the call system 100 of the first embodiment.

In addition, the call system of the second embodiment is able to deal with a plurality of SOS types and to simultaneously call contact target telephones in an appropriate range. Therefore, if a fire occurs, for example, the call system is able to simultaneously call residents living in the area around the scene to prevent them from failing to escape. On the other hand, if a crime occurs, the call system is able to simultaneously call residents living in the area around the scene to make them exercise caution.

The following describes modification examples of a process of narrowing down contact target telephones, performed in the contact process of FIG. 8

FIRST MODIFICATION EXAMPLE

In the first modification example, the control unit 13 extracts the postal code of a source point on the basis of the coordinate information of the source point. Then, the control unit 13 searches the registration information table T2 to find records with the same postal code as the extracted one.

Figure 15:
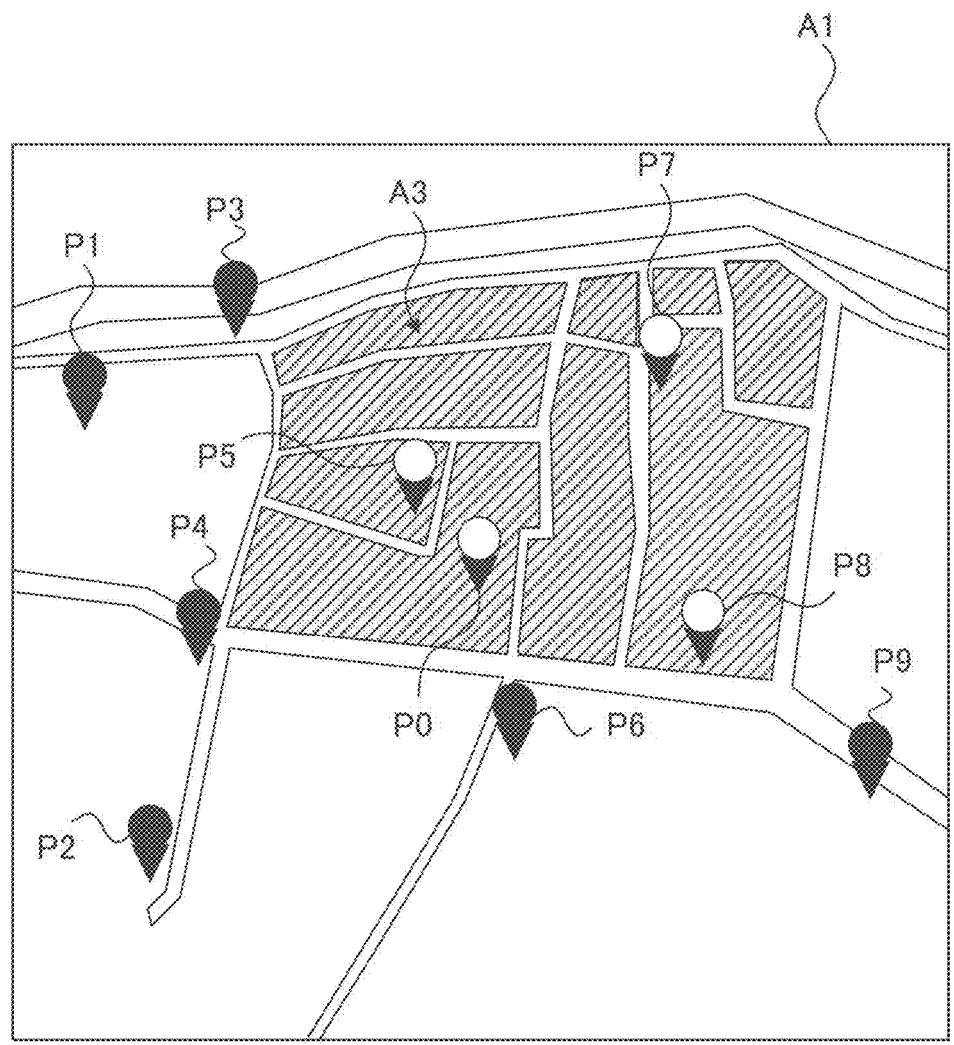
FIG. 15 is a view for explaining a first modification example of the contact process.

FIG. 15 illustrates a modification example of the contact process. An area A3 indicated by oblique lines is an area that has the same postal code as the source point P0. Therefore, in the first modification example, the control unit 13 extracts records with coordinate information P5, P7, and P8. Thereby, it is possible to simultaneously contact residents in the surrounding area to inform them of evacuation information or others for a local disaster.

SECOND MODIFICATION EXAMPLE

In the second modification example, the control unit 13 automatically creates a geofence (virtual geographic boundary) that is a range including a source point. Then, the control unit 13 searches the registration information table T2 to find records with coordinate information falling within the created geofence.

Figure 16A:
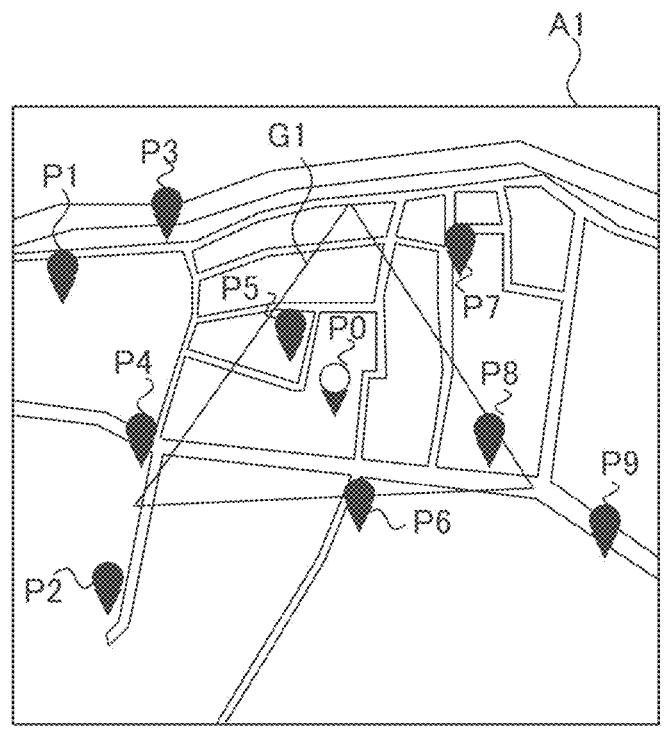
FIGS. 16A and 16B are views for explaining examples of creating a geofence.
Figure 16B:
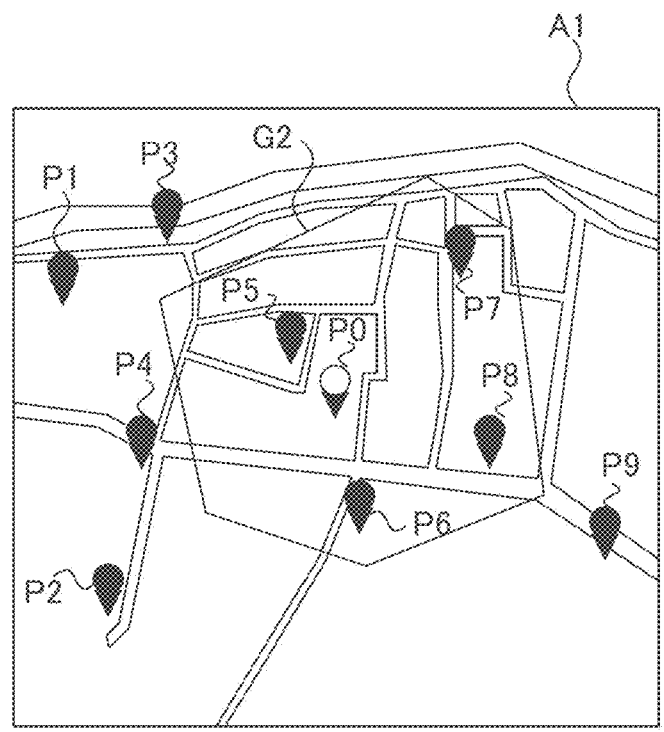
Figure 17:
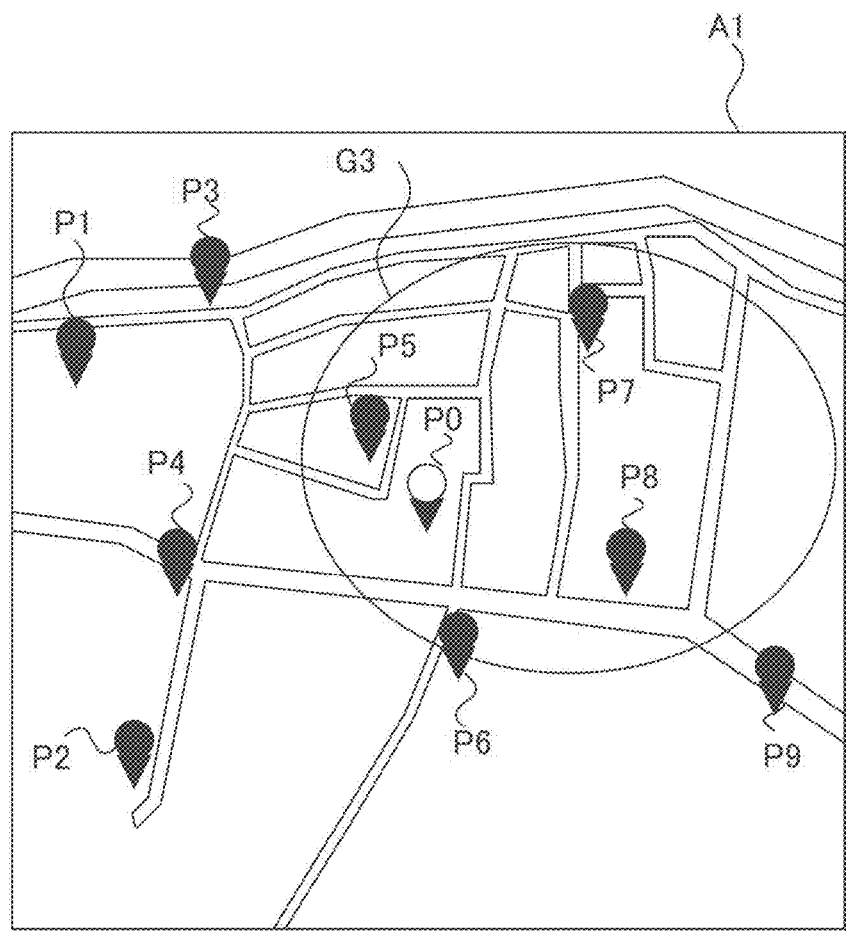
FIG. 17 is a view for explaining another example of creating a geofence.

FIGS. 16A, 16B, and 17 are views for explaining examples of creating a geofence.

FIGS. 16A and 16B illustrate examples of a polygonal geofence. FIG. 16A illustrates a triangle geofence G1. In the case where an emergency occurs at a source point P0 in FIG. 16A, the control unit 13 extracts a record with coordinate information P5 and P8 falling within the geofence G1 including the source point P0.

FIG. 16B illustrates a hexagon geofence G2. In the case where an emergency occurs at a source point P0 in FIG. 16B, the control unit 13 extracts records with coordinate information P5, P6, P7, and P8 falling within the geofence G2 including the source point P0.

FIG. 17 is an example of an oval geofence. FIG. 17 illustrates an oval geofence G3. In the case where an emergency occurs at a source point P0, the control unit 13 extracts records with coordinate information P5, P7, and P8 falling within the geofence G3 including the source point P0. In this connection, as in the example of FIG. 17, the center of the geofence does not need to match the source point P0. In addition, although not illustrated, a geofence may have another polygonal or circular shape. In addition, a geofence may be set manually.

THIRD MODIFICATION EXAMPLE

In the third modification example, the control unit 13 searches the registration information table T2 to find records with coordinate information falling within an area (for example, an area administrated by a fire department) including a source point, specified by an administrative organization or the like.

Figure 18:
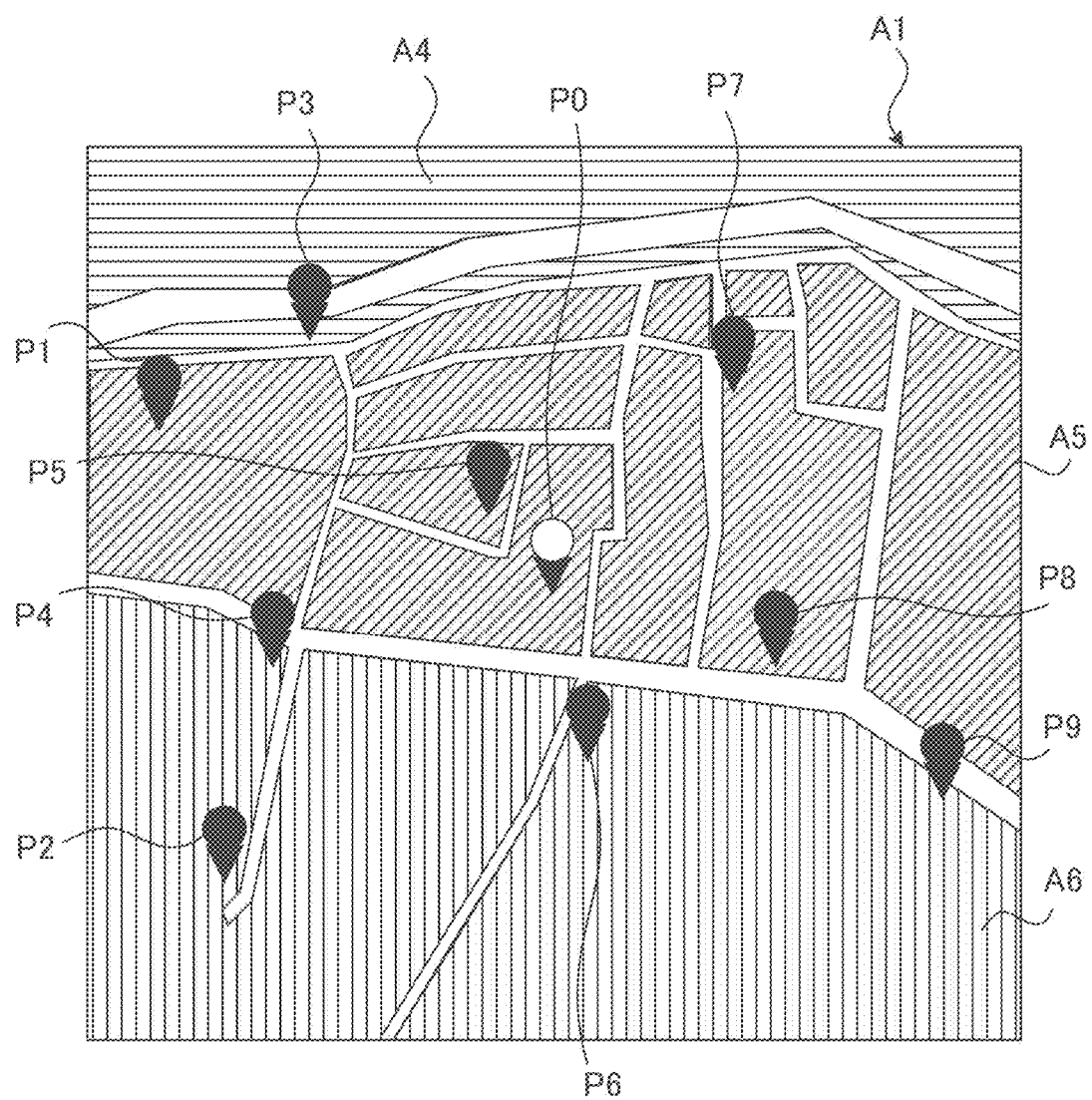
FIG. 18 is a view for explaining a third modification example of the contact process.

FIG. 18 illustrates the third modification example of the contact process. In the example of FIG. 18, an area A1 includes a first area A4, a second area A5, and a third area A6 that are administrated by a fire department. Oblique lines of the same type indicate the same area.

In the case where an emergency occurs at a source point P0, the control unit 13 extracts records with coordinate information P1, P5, P7, and P8 falling within the second area A5 including the source point P0. Here, a plurality of areas may be extracted according to the scale of a disaster.

Note that the processing performed by the call apparatus 1 may be performed in a distributed manner by a plurality of apparatuses. For example, a certain apparatus may generate source information and another apparatus may specify contact target telephones using the source information.

Heretofore, the call system for simultaneous calls to telephones in an area for disaster and emergency has been described with reference to the embodiments illustrated. The invention is not limited thereto, and the components of each unit may be replaced with other components having equivalent functions. In addition, other desired configurations and steps may be added to the invention.

Further, two or more desired configurations (features) in the above-described embodiments may be combined.

The above-described processing functions may be implemented by using a computer. In this case, a program is prepared, which describes processes for the functions of the call apparatus 1. A computer implements the above-described processing functions by executing the program. The program describing the intended processes may be recorded on a computer-readable recording medium. Computer-readable recording media include magnetic storage devices, optical discs, magneto-optical recording media, semiconductor memories, etc. The magnetic storage devices include HDDs, flexible disks (FD), magnetic tapes, etc. The optical discs include DVDs, DVD-RAMs, CD-ROMs, CD-RWs, etc. The magneto-optical recording media include MOs (magneto-optical disk), etc.

To distribute the program, portable recording media, such as DVDs and CD-ROMs, on which the program is recorded, may be put on sale, for example. Alternatively, the program may be stored in the storage device of a server computer and may be transferred from the server computer to other computers over a network.

A computer that is to run the above program stores in its local storage device the program recorded on a portable recording medium or transferred from the server computer, for example. Then, the computer reads the program from the local storage device, and runs the program. The computer may run the program directly from the portable recording medium. Also, while receiving the program being transferred from the server computer over a network, the computer may sequentially run this program.

In addition, the above-described processing functions may also be implemented wholly or partly by using DSP (digital signal processor), ASIC (application-specific integrated circuit), PLD (programmable logic device), or other electronic circuits.

According to one aspect, it is possible for a person to receive a call for an advance notice when an emergency occurs nearby.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A call apparatus comprising:
a first memory configured to store therein location information of telephones including a landline telephone, the telephones being call targets;
a second memory configured to store therein information indicating, for each of a plurality of different of types of SOS, a corresponding range of an area to be used for extraction, wherein the range is a governmental administrative division;
a communications interface configured to receive an SOS; and
a processor configured to perform a process including,
accessing the second memory to determine, according to a type of the SOS received by the communications interface, the corresponding range of the area for extraction,
accessing the first memory to specify telephones located within the determined area, and
simultaneously calling the specified telephones;
wherein the information stored in the second memory relates the plurality of different types of SOS each to a plurality of binary indicators, wherein each of the binary indicators has a value indication the governmental administrative division is included or not included in the range.

2. The call apparatus according to claim 1, wherein,
the first memory further stores therein information about receivers of calls in association with respective emergency types that the receivers are able to deal with; and
the accessing to the first memory includes,
accessing the first memory to specify telephones which are located within a prescribed search range from a source point of the SOS received by the communications interface and which are owned by receivers who are able to deal with an emergency type of the received SOS,
extracting a prescribed number of telephones in order from a closest distance to the source point, and
simultaneously calling the extracted telephones.

3. The call apparatus of claim 1, wherein the plurality of different of types of SOS include a person in cardiac arrest, a fire, a gas leakage, a local disaster, a tsunami, a flood, a landslide disaster, an eruption, a finding of a dangerous object, and/or a terrorism event each having a corresponding range of an area to be used for extraction.

4. The call apparatus of claim 1, wherein the range includes at least one of city, block number, and house number.

5. The call apparatus of claim 1, wherein the corresponding range for extraction is sized based on a scale of the SOS.

* * * * *